United States Patent [19]

Drexel et al.

[11] Patent Number: 5,165,655

[45] Date of Patent: Nov. 24, 1992

[54] FLOW CONTROL VALVE ASSEMBLY MINIMIZING GENERATION AND ENTRAPMENT OF CONTAMINANTS

[75] Inventors: Charles F. Drexel, Rolling Hills; Hamid Saghatchi, Orange, both of Calif.

[73] Assignee: DXL USA, Torrance, Calif.

[21] Appl. No.: 729,075

[22] Filed: Jul. 12, 1991

[51] Int. Cl.⁵ ............................................. F16K 31/06
[52] U.S. Cl. ......................... 251/129.02; 251/129.17; 251/303; 251/368; 137/901
[58] Field of Search ................... 251/303, 321, 129.02, 251/129.17, 129.19, 368; 137/901

[56] References Cited

U.S. PATENT DOCUMENTS

| | | | |
|---|---|---|---|
| 2,349,209 | 5/1944 | Taylor | 137/901 X |
| 4,558,587 | 12/1985 | Fruzzetti | 137/901 X |
| 4,852,605 | 8/1989 | Gouhier | 251/129.17 X |
| 4,911,405 | 3/1990 | Weissgerber | 137/901 X |

*Primary Examiner*—Arnold Rosenthal
*Attorney, Agent, or Firm*—Spensley Horn Jubas & Lubitz

[57] ABSTRACT

A hermetically sealed, precision fluid valve assembly including a ball valve element is disclosed. The assembly includes a valve element retainer comprising a thin, flexible member having a first portion operatively associated with the valve element and a second portion, extending from the first, secured to the body of the valve assembly. The valve element retainer guides the motion of the valve element and is designed to reduce friction and eliminate the generation and entrapment of contaminants, thereby minimizing hysteresis in the operation of the valve.

20 Claims, 5 Drawing Sheets

FLOW CONTROL VALVE ASSEMBLY MINIMIZING GENERATION AND ENTRAPMENT OF CONTAMINANTS

FIELD OF THE INVENTION

The present invention relates generally to fluid valve assemblies and particularly to a flow control valve assembly having a valve element retainer minimizing the generation and entrapment of contaminants.

BACKGROUND OF THE INVENTION

The control of the mass flow of gases is important in many industries. During the manufacture of semiconductors, for example, many of the processes require a precise reaction of two or more gases under carefully controlled conditions. Since chemical reactions occur on a molecular level, the control of mass flow is the most direct way to regulate the gases.

There have been developed in the art a variety of instruments for measuring the mass flow rate of gases from below 5 standard cubic centimeters per minute (SCCM) to more than 500,000 SCCM. The prevalent design of such instruments requires that the flow of the gas be divided into two or more paths. In a typical instrument such as that described in Reissue U.S. Pat. No. Re. 31,570, dated May 1, 1984, and entitled "Fluid Flowmeter", a small flow is routed through a sensor assembly where the mass flow is measured, while most of the flow is routed through a flow splitter section in parallel with the sensor assembly. The sensor assembly contains a capillary tube with two resistance thermometers wound on the outside. The resistance thermometers form two active legs of an electronic bridge; the other two legs are usually fixed resistors. The bridge is carefully designed and manufactured so that the two resistors are as identical as possible in electrical and thermal characteristics. When a voltage is applied across the bridge, current through the resistance thermometers causes them to self-heat. When there is no flow of gas through the capillary tube, both of the thermometers heat up identically. As gas begins to flow through the tube, the gas cools the first resistance thermometer and transfers a portion of that heat to the second one, causing it to get warmer. The temperature difference between the two thermometers is a function of mass flow.

After passing through the sensor and splitter, the gas flows through a valve assembly which precisely controls the mass flow of the gas. In existing valve assemblies, the valve element may be either a ball that cooperates with a conical seat or a flat plate adapted to engage a raised and rounded seat. Balls are preferred because they are typically less expensive, simpler and more precise than flat plates. This is because there is a large supply of low cost standard balls made to a sphericity of 10 millionths of an inch or better on modern ball grinding machines. Also, it is very easy to produce ball seats to similar tolerances using simple coining techniques. Conversely, flat valve elements are specially made and do not benefit from standardization. The raised and rounded seats used for flat valves are difficult to make and even more difficult to repair if physically damaged.

In any case, the valve element and seat must be sealed from impurities in the external atmosphere and this is accomplished by either a flexible diaphragm or bellows welded in place. The gas flow is controlled by an external actuator operable to press on the flexible member to seat the valve element and thereby close the valve. Differential gas pressure or a spring provides the opening force.

In the manufacture of semiconductor devices, and especially those having features of one micron or less, the amount of reactant gas must be carefully controlled and the gas must be completely free from contamination. Particles, vapors and contaminant gases, such as dust, metal, lint, moisture, solvents, oil, air or other process gases can spoil the products. It is therefore important that the flow passages used in mass flow controllers neither trap such contaminants and subsequently release them to the gas stream, nor generate such contaminants during normal calibration and operation.

Typically, friction causes gas valves to deteriorate and generate undesirable small particles which contaminate the reactant gases. One source of such contamination in existing gas valves is the frictional engagement between the ball valve and the walls of the guiding members retaining the ball. Particles thus generated may become trapped in the pocket surrounding the ball and resist removal by purge gases periodically introduced to sweep the gas path. In addition, when valves are used as part of a control system to regulate the flow of gases, friction and particulate matter can cause undesirable hysteresis in the control system. An example of a prior art hermetically sealed gas valve in which these problems may arise is shown in FIGS. 7 and 8 of co-pending U.S. patent application Ser. No. 07/668,283 filed Mar. 12, 1991 for "Diaphragm Assembly for Transmitting Force and Motion Between Sealed Environments".

It is therefore an overall object of the present invention to provide a valve assembly which minimizes the generation and entrapment of contaminants.

It is a more specific object of the present invention to provide a valve assembly which eliminates unswept volumes in the gas stream which may form contaminant-trapping pockets or recesses.

Still another object of the invention is to provide a valve assembly in which hysteresis due to valve element friction and/or trapped particulate matter is minimized.

SUMMARY OF THE INVENTION

Generally, the present invention provides a valve assembly including a valve element retainer permitting near perfect alignment between the element and its seat, and minimizing friction and the generation and entrapment of particles which could affect the chemical process or impede ball motion thereby adding hysteresis.

In accordance with the broad aspects of the invention, there is provided a fluid valve assembly including a valve body defining a cavity and fluid inlet and outlet passages communicating with the cavity. The inlet passage opens into the cavity at an inlet port which defines a valve seat. A valve element, preferably in the form of a ball, is disposed within the cavity and is adapted to engage the valve seat to thereby close the inlet port.

The assembly further comprises means, such as an isolating diaphragm, operatively associated with the valve element for moving the valve element into sealing engagement with the valve seat. Last, there is provided a valve element retainer comprising a thin, flexible member having a first portion operatively associated with the valve element and a second portion, extending from the first, fixed to a surface of the valve body. In accordance with one specific, exemplary form of the invention, the retainer comprises a wire the first portion of which loosely surrounds the valve element.

BRIEF DESCRIPTION OF THE DRAWINGS

The foregoing and other features, advantages and objects of the invention will become apparent from the detailed description which follows, considered together with the accompanying drawings in which.

DETAILED DESCRIPTION OF THE PREFERRED EMBODIMENTS

Figure 1:
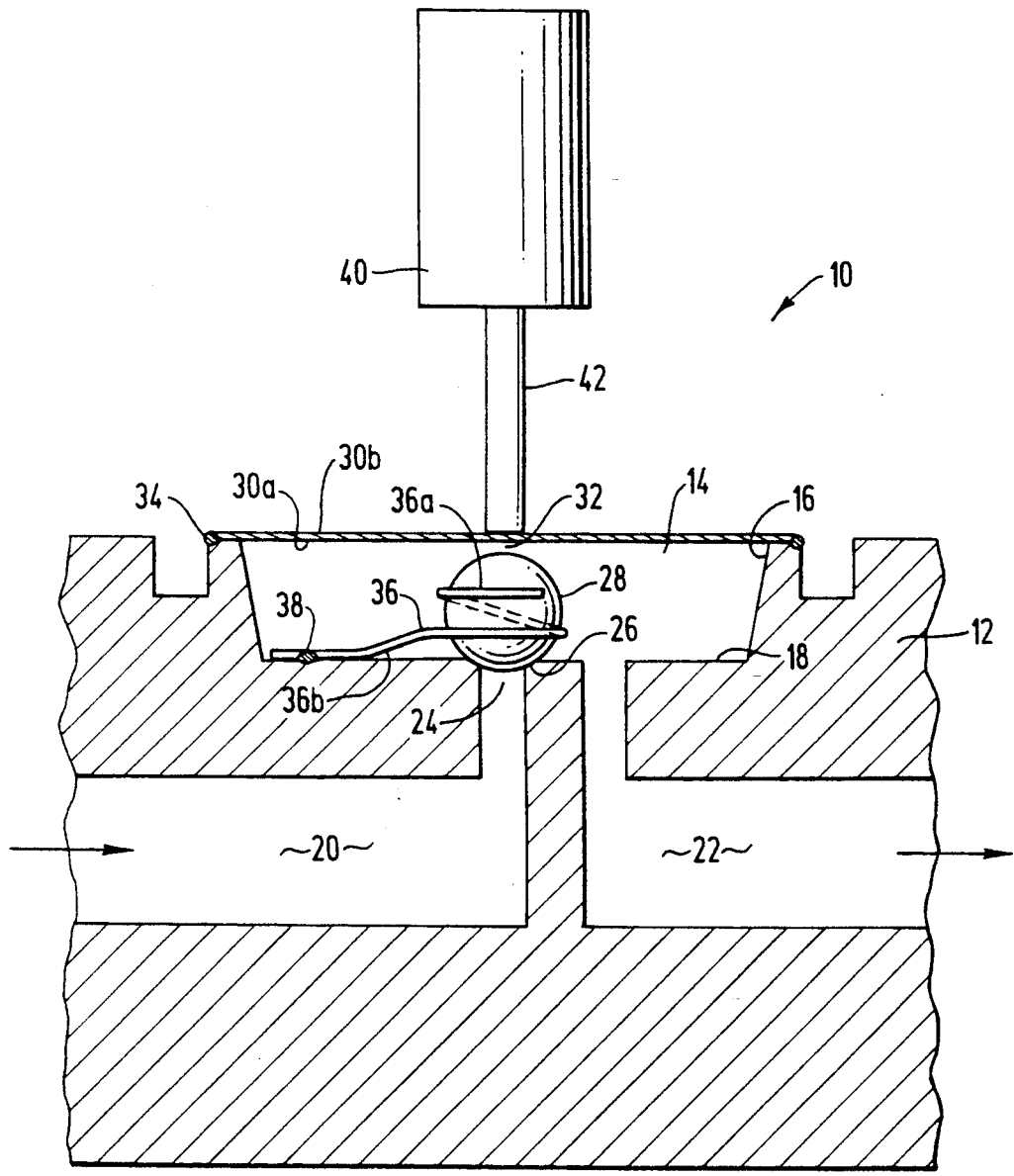
FIG. 1 is a side elevation view, in cross section, of a valve assembly incorporating the features of the present invention in accordance with a first embodiment thereof.

Turning now to the drawings in which like reference numerals designate like parts, FIG. 1 shows a valve assembly 10 in accordance with a first embodiment of the invention. The assembly 10 includes a valve body 12 defining a cavity 14 having side walls 16 and a bottom wall 18. The valve body 12 further defines a gas inlet passage 20 and a gas outlet passage 22. The inlet passage 20 communicates with the cavity 14 at an inlet port 24 in the central portion of the bottom wall of the cavity. The port 24 is circumscribed by a valve seat 26 for receiving a valve element 28. The valve element is preferably in the form of a ball adapted to engage the seat 26 whose shape may be, by way of example, sharp-edged or generally conical to at least substantially conform to the contour of the ball 28.

The cavity is closed by an isolating, flexible diaphragm 30 having an internal surface 30a facing the cavity 14 and an external surface 30b. The ball valve element 28 is disposed between the internal surface 30a and the valve seat 26. In the neutral position of the diaphragm 30 depicted in FIG. 1, a small gap 32 exists between the top of the ball and the internal surface 30a of the diaphragm.

The diaphragm is welded or otherwise secured along a junction 34 to a surface of the valve body surrounding the cavity 14 to form a gas-tight seal and thereby isolate the cavity 14, the passages 20 and 22, the valve element 28 and the seat 26 from the outside atmosphere. Various diaphragm designs are disclosed in the above-referenced patent application Ser. No. 07/668,283.

In accordance with the invention, the ball 28 is held in a retainer comprising a thin flexible member 36 which may take the form of a length of thin wire having a diameter, for example, of 0.013 inch (0.33 mm). The wire 36 has a first portion 36a operatively associated with the ball; specifically, the portion 36a is loosely looped about the ball. A second portion 36b of the wire 36, extending from the first portion, is attached to the bottom wall of the valve cavity 14 by pinning or welding at point 38. In the preferred form of this embodiment, the wire ring loop 36a fits loosely around the ball with a clearance of about 0.001-0.010 inch (0.025-0.254 mm) depending on the size of the ball 28 and the seat 26. By way of example, a typical ball may have a diameter of 0.109 inch (2.77 mm). The looseness of the loop 36a is just sufficient to permit the ball to fit perfectly in the valve seat without side forces from the wire, yet not so loose as to cause measurable frictional forces due to sidewise motion of the ball as it tries to center itself. The generation of particulate matter is likewise reduced and there are no pockets or recesses which could trap contaminants. Furthermore, because the thin wire does not present a significant barrier, purging with inert gases is not impeded and is effective to reach all portions of the seat, valve element and their surroundings. Still further, the looseness of the ball and the dimensions of the valve cavity are such that the ball is always contained between the flexible diaphragm and seat at the maximum excursion of the diaphragm.

The ball valve element 28 may be either a metal or ceramic material, depending on the application. Balls made from synthetic ruby or sapphire can also be used; these can be purchased to closer tolerances than metals which can withstand the gas corrosiveness. Further, ruby or sapphire ball valve elements are believed to generate fewer metal particles than metal balls because there is only one wearing metal member instead of two and the friction between ceramic and metal is less than metal against metal.

Figure 2:
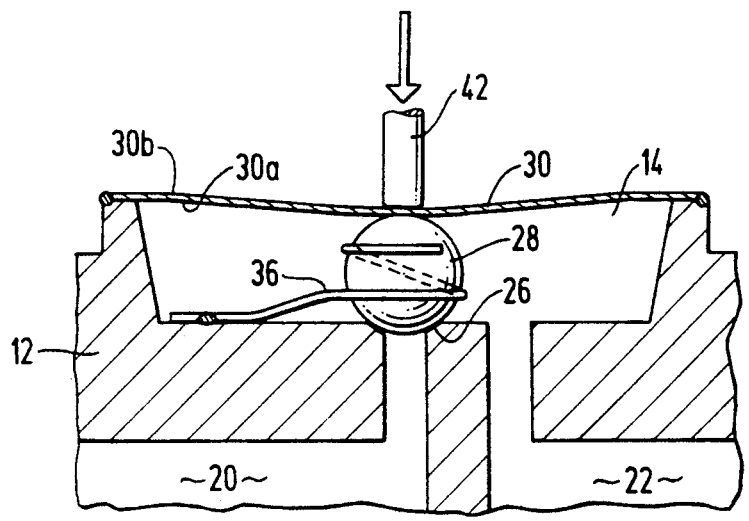
FIGS. 2 and 3 are side elevation views, in cross section, of a portion of the valve assembly of FIG. 1 showing the valve element in its closed and open positions, respectively.
Figure 3:
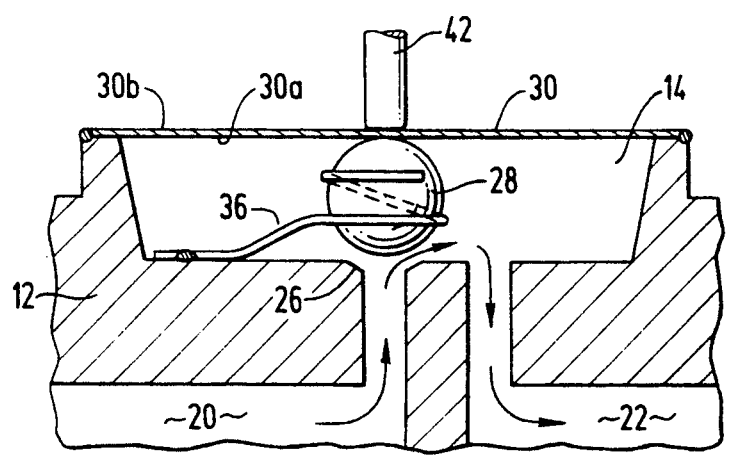

The valve assembly 10, which is normally open valve, is operated by a push type solenoid-actuator 40 having a plunger 42 bearing against the external surface 30b of the isolating diaphragm 30. With reference to FIG. 2, energization of the actuator 40 causes the plunger 42 to deflect the diaphragm 30 sufficiently to contact the ball 28 and to force the ball into sealing engagement with the seat 26 thereby closing the valve. Conversely, as shown in FIG. 3, deenergization of the solenoid actuator 40 allows the high pressure gas stream in the inlet passage 20 to unseat the ball 28 and to pass from the passage 20 to the outlet passage 22 via the cavity 14, the flow rate of the stream being a function of the pressure differential across the diaphragm 30 and the displacement of the ball from its seat.

Figure 4:
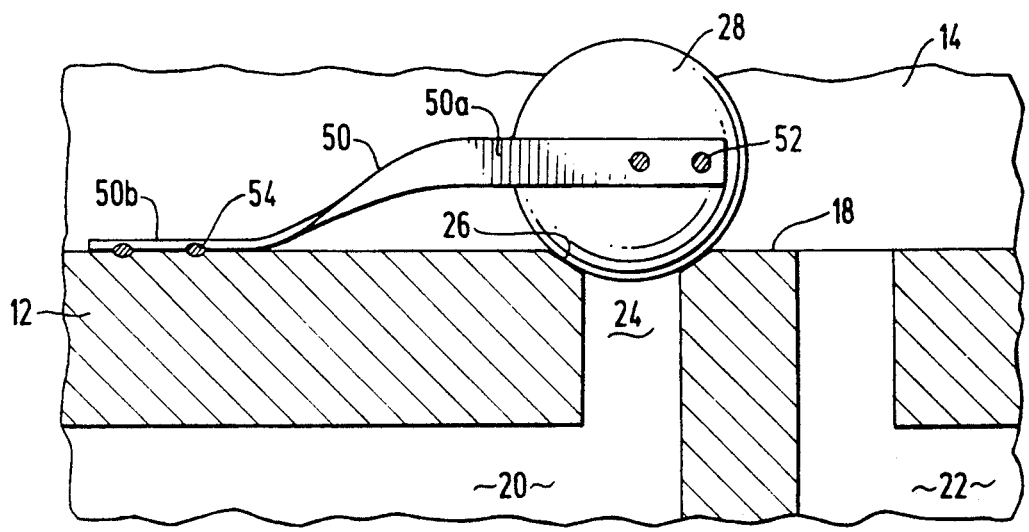
FIGS. 4 and 5 show a side elevation view and a top plan view, respectively, partly in cross section, of a portion of a valve assembly in accordance with a second embodiment of the present invention.
Figure 5:
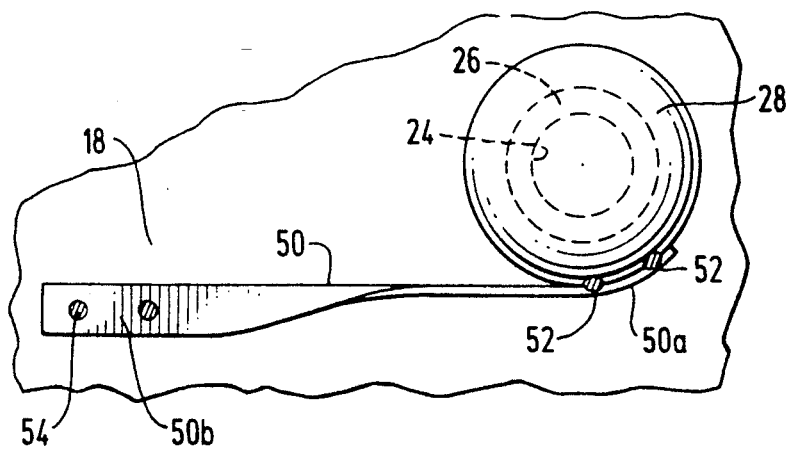

FIGS. 4 and 5 show a second embodiment of the invention which differs from the first embodiment only in the form of the valve element retainer and in the specific way in which the retainer cooperates with the valve element.

In the second embodiment, a valve element retainer 50, in the form of a thin, flexible ribbon, has a first portion 50a secured (for example, by spot welds 52) to the side of a ball valve element 28. A second portion 50b of the ribbon 50, extending from the first portion, is secured, for example, by spot welds 54, to the bottom wall 18 of the cavity 14 in which the valve element is disposed. The ribbon 50 holds the ball valve element 28 and guides its motion into and out of engagement with the conical valve seat 26. In this embodiment, if spot welding is used to secure the ribbon to the ball, the ball must be made of metal. Alternatively, however, the ribbon 50 may be secured to the ball by tightly wrapping the first portion 50a (which would be lengthened as necessary for this purpose) around the midsection or equator of the ball. Such an attachment technique is more versatile as it permits the use of non-metallic balls, including those made of ceramic or synthetic ruby or sapphire. As a further alternative to the second embodiment, instead of the ribbon 50 shown in the drawings and heretofore described, the retainer may take the form of a wire having a first portion spot welded to the ball valve element and a second portion, extending from the first, secured to a wall of the cavity, along the lines already described. Regardless of its specific form, the thin, flexible retainer provides virtually no resistance to the motion and centering of the valve element, is essentially frictionless and does not generate or trap particulate matter.

Figure 6:
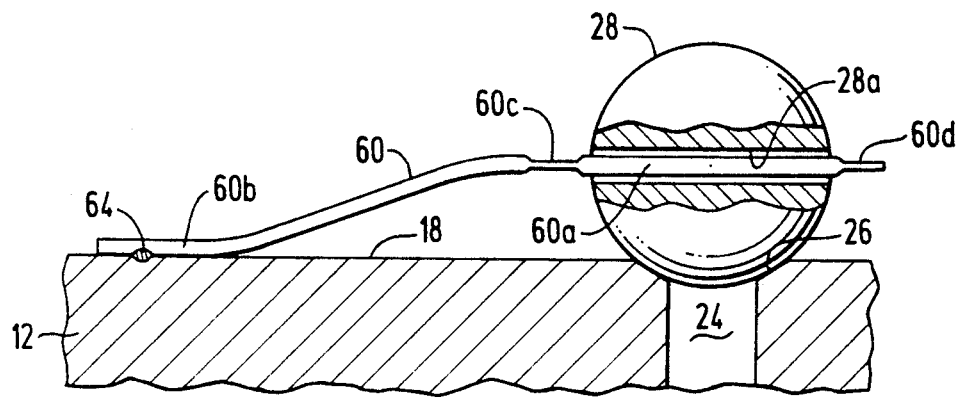
FIGS. 6 and 7 show a side elevation view and a top plan view, respectively, partly in cross section, of a portion of a valve assembly in accordance with a third embodiment of the present invention.
Figure 7:
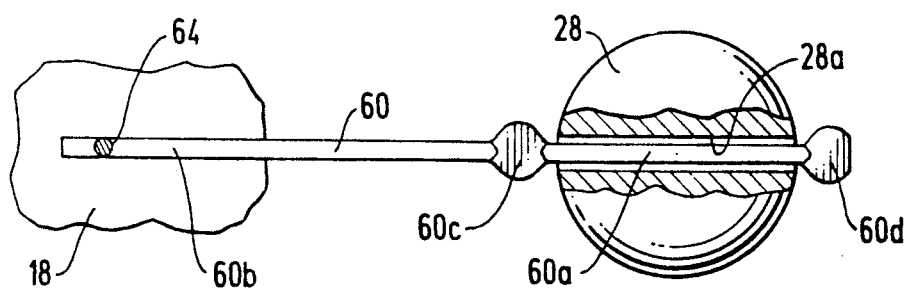

In accordance with a third embodiment of the invention shown in FIGS. 6 and 7, the retainer may take the form of a wire 60 having a first portion 60a passing through a diametric hole 28a in the ball 28 and a second portion 60b extending from the first portion, and spot welded, pinned or otherwise secured at 64 to the valve body 12. The wire portion 60a is flattened at diametrically opposed points 60c and 60d adjacent the surface of the ball 28 so as to position the ball and limit the movement thereof along the wire. A small amount of valve element play along the wire portion 60a can be provided, and the diameter of the hole 28a may be made slightly larger than the diameter of the wire 60. The ball element 28 is thereby free to center itself in the valve seat 26.

Figure 8:
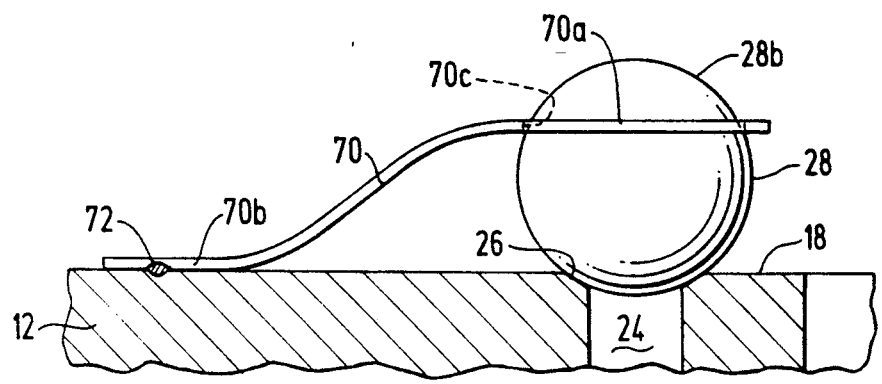
FIGS. 8 and 9 show a side elevation view and a top plan view, respectively, partly in cross section, of a portion of a valve assembly in accordance with a fourth embodiment of the present invention.
Figure 9:
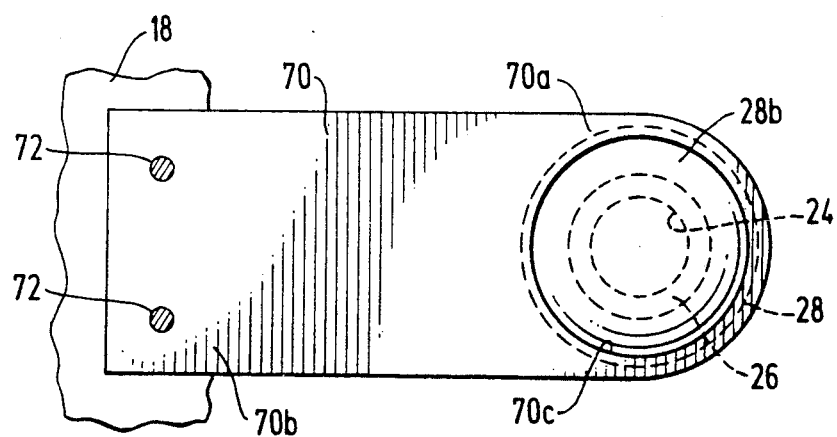

A fourth embodiment of the invention, again differing from the other embodiment only in the form of the retainer, is shown in FIGS. 8 and 9. This embodiment includes a ball valve element 28 of metal or ceramic or synthetic ruby or sapphire, adapted to cooperate with a conical valve seat 26 in a fashion already described. A retainer in the form a thin, flexible sheet member 70 holds the ball valve element 28 and guides its motion between the open and closed positions. More specifically, sheet member 70 includes a first portion 70a operatively associated with the ball and a second portion 70b secured, as by spot welds 72, to the bottom wall 18 of the valve body 12. The first portion 70a includes a hole 70c having a diameter somewhat smaller than that of the ball valve element. An upper portion 28b of the ball element 28 projects through the hole 70c. With the isolating diaphragm (not shown in FIGS. 8 or 9) in the neutral position (see FIG. 1), the edges of the hole 70c may bear lightly against the ball valve element; alternatively, a small gap between that edge and the surface of the ball may be provided when the ball valve element is resting on the valve seat.

Although the invention has been described in terms of certain preferred embodiments thereof, other embodiments that are apparent to those of ordinary skill in the art are also within the scope of the invention. Accordingly, the scope of the invention is intended to be defined and limited only by reference to the appended claims.

What is claimed is:

1. In a fluid valve assembly, the combination comprising:
 a valve body defining a cavity and fluid inlet and outlet passages communicating with the cavity, the inlet passage opening into the cavity at an inlet port, the inlet port having a valve seat;
 a valve element disposed within the cavity, away from said valve seat, and adapted to engage the valve seat to thereby close the inlet port;
 means operatively associated with the valve element for moving the element into the sealing engagement with the valve seat; and
 a valve element retainer comprising a thin flexible member having a first portion operatively associated with and loosely coupled to the valve element and a second portion fixed to the valve body, said retainer guiding the motion of the valve element between its closed and open positions.

2. The combination, as defined in claim 1, in which: the valve element comprises a ball.

3. The combination, as defined in claim 2, in which: the ball is made of a material selected from the group consisting of metal, ceramic, ruby and sapphire.

4. The combination, as defined in claim 1, in which: said valve cavity having walls and an open side.

5. The combination, as defined in claim 1, in which: the retainer comprises a wire, the first portion of the wire comprising at least one loop disposed about the valve element and the second portion of the wire comprising a portion of the wire extending from said at least one loop.

6. The combination, as defined in claim 5, in which: the second portion of the wire has an end fixed to a wall of the cavity.

7. The combination, as defined in claim 2, in which: the retainer comprises a wire and the ball includes a diametric hole, the first portion of the wire extending through the hole, the first portion of the wire including means for limiting the movement of the ball along the wire.

8. The combination, as defined in claim 7, in which: the diameter of the hole is slightly larger than the diameter of the wire.

9. The combination, as defined in claim 2, in which: the retainer comprises a sheet member, the first portion of the sheet member having a hole with a diameter smaller than the diameter of the ball, an upper portion of the ball projecting through said hole.

10. The combination, as defined in claim 4, in which: a flexible diaphragm is disposed across the open side of the cavity to seal and isolate the cavity.

11. The combination, as defined in claim 10, in which: said diaphragm has an internal surface facing the cavity and an external surface.

12. The combination, as defined in claim 11, in which: said valve element is disposed within the cavity between the valve seat and the internal surface of said diaphragm.

13. The combination, as defined in claim 12, in which: said means operatively associated with said valve element includes an actuator.

14. The combination, as defined in claim 13, in which: said actuator is operatively associated with the exterior surface of said diaphragm.

15. The combination, as defined in claim 14, in which: said actuator is movable to deflect said diaphragm and displace said valve element into said sealing engagement with said valve seat.

16. A fluid valve assembly comprising:
 a valve body defining a cavity having walls and an open side, said body further defining a fluid inlet passage and a fluid outlet passage, said passages communicating with the cavity, the body further defining a valve seat at the junction of the inlet passage and the cavity;

a flexible diaphragm disposed across the open side of the cavity to seal and isolate the cavity, said diaphragm having an internal surface facing the cavity, and an external surface;

a ball valve element disposed within the cavity between the valve seat and the internal surface of the diaphragm, said ball being displaceable between a closed position in which the ball engages the valve seat, and an open position in which the ball is out of engagement with the valve seat, displacement of the ball being constrained by the diaphragm;

an actuator operatively associated with the exterior surface of the diaphragm, the actuator being movable to deflect the diaphragm and displace the ball into sealing engagement with the valve seat; and a retainer comprising a thin, flexible member having a first portion loosely coupled to the ball valve element and a second portion extending from the first portion and fixed to a wall of the cavity.

17. A valve assembly, as defined in claim 16, in which:

the ball is made of a material selected from the group consisting of metal, ceramic, ruby and sapphire.

18. A valve assembly, as defined in claim 16, in which:

the retainer comprises a wire, the first portion of the wire comprising at least one loop disposed about the ball and the second portion of the wire comprising a portion extending from said at least one loop.

19. The combination, as defined in claim 16, in which:

the retainer comprises a wire and the ball includes a diametric hole, the first portion of the wire extending through the hole, the first portion of the wire including means for limiting the movement of the ball along the wire.

20. The combination, as defined in claim 16, in which:

the retainer comprises a sheet member, the first portion of the sheet member having a hole with a diameter smaller than the diameter of the ball, an upper portion of the ball projecting through said hole.

* * * * *